July 20, 1926.
B. THORN
1,592,913
SAWING ATTACHMENT FOR AUTOMOBILES
Filed July 27, 1923   2 Sheets-Sheet 1
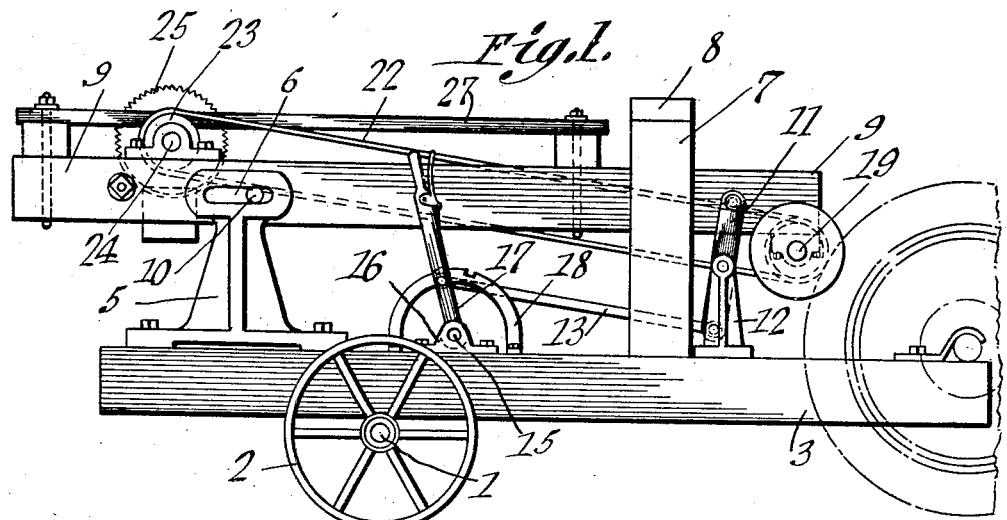
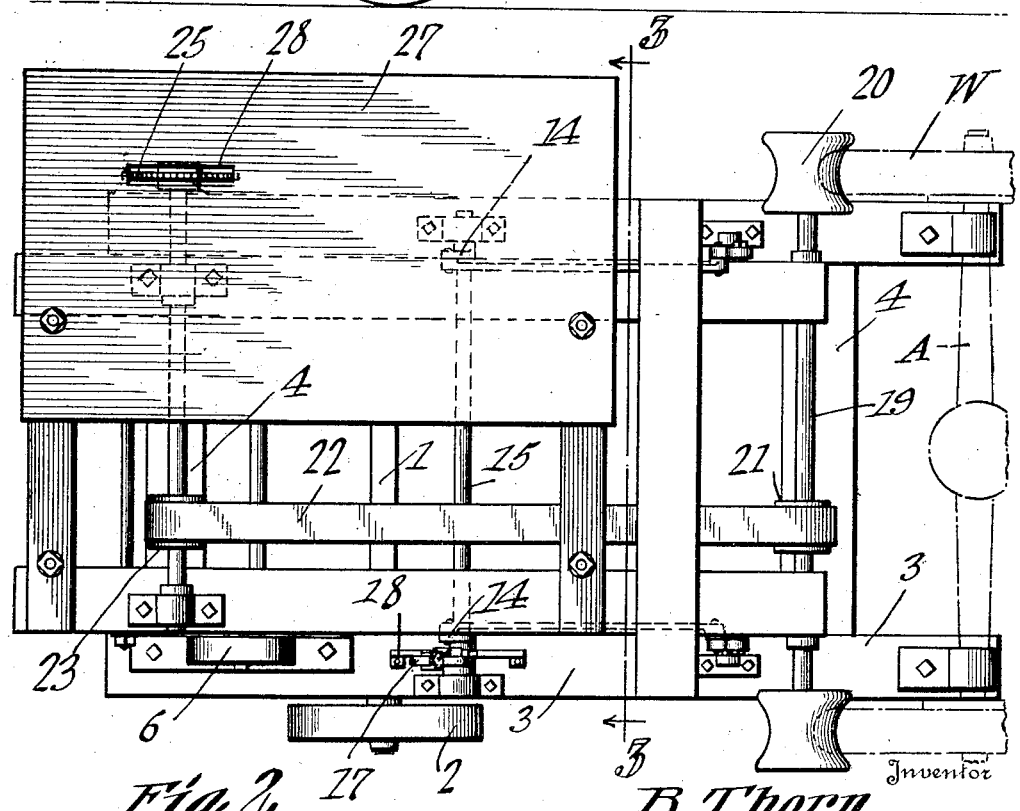
Inventor
B. Thorn
By C. A. Knowles
Attorney July 20, 1926.

B. THORN 1,592,913

SAWING ATTACHMENT FOR AUTOMOBILES

Filed July 27, 1923   2 Sheets-Sheet 2

B. Thorn, Inventor

Patented July 20, 1926.

1,592,913

UNITED STATES PATENT OFFICE.

BENJAMIN THORN, OF CRESTVIEW, TENNESSEE.

SAWING ATTACHMENT FOR AUTOMOBILES.

Application filed July 27, 1923. Serial No. 654,186.

This invention relates to a sawing attachment for automobiles, one of the objects being to provide an attachment in the form of a trailer that can be fixed to the back end of an automobile and pulled thereby from place to place, means being employed whereby, after jacking up the rear end of the automobile, the sawing mechanism can be placed in operative relation with the rear wheels of the automobile so as to be driven thereby.

Another object is to provide a structure of this character which is simple, durable and compact in construction and which can be manipulated readily for the purpose of applying and cutting off the power to the saw.

Another object is to provide a sawing mechanism utilizing a table that can be removed readily to allow for the use of a carriage in sawing.

With the foregoing and other objects in view which will appear as the description proceeds, the invention resides in the combination and arrangement of parts and in the details of construction hereinafter described and claimed, it being understood that changes in the precise embodiment of the invention herein disclosed may be made within the scope of what is claimed without departing from the spirit of the invention.

In the accompanying drawings the preferred form of the invention has been shown.

In said drawings:—

Figure 1 is a side elevation of the apparatus, a portion of an automobile to which it is attached being indicated by broken lines.

Fig. 2 is a plan view of the structure shown in Fig. 1.

Figure 3:
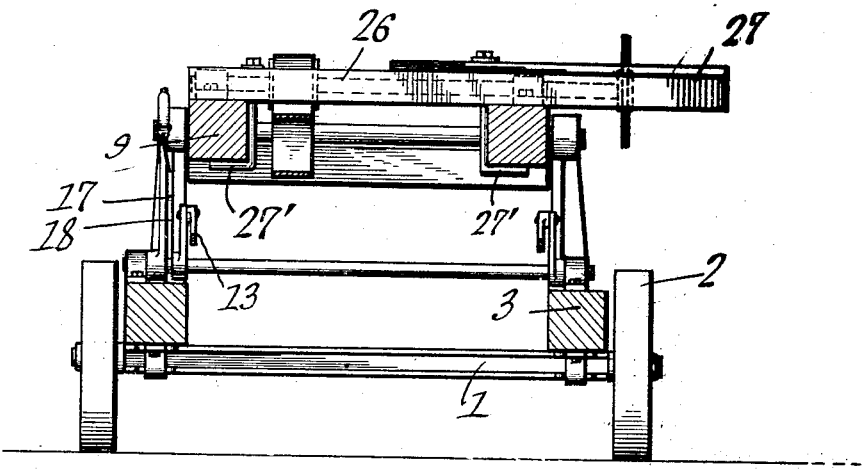
Fig. 3 is a section on line 3—3, Fig. 2.

Referring to the figures by characters of reference 1 designates the axle of the trailer, the same being supported by wheels 2 and having side beams 3 fastened thereon. These side beams are adapted to be connected in any suitable manner to the rear axle A of an automobile so that the trailer can be drawn readily from place to place.

Both of the side beams 3 are suitably connected at any suitable point as by means of cross beams 4 and mounted on the side beams at their rear ends are standards 5 provided, in their upper end portions, with longitudinal slots 6. Additional standards are mounted on the side beams 3 near their front ends, as indicated at 7, these standards being connected by a cross beam 8 so as to form a guide frame.

Mounted between the standards 5 is a shiftable frame 9 having laterally extending studs 10 slidably and rotatably mounted within the slots 6. This shiftable frame projects through the space between the standards 7 and is supported at its front end by levers 11. These levers are pivotally connected at their upper ends through the shiftable frame 9 and are mounted between their ends upon standards 12 mounted on the side beams 3. The lower arms of the levers are connected by rods 13 to crank arms 14 extending from a transverse shaft 15. This shaft is journaled in suitable bearings provided therefor at 16 on the beams 3. A hand lever 17 is secured to the shaft and cooperates with a notched segment 18, the usual means being provided on the lever for holding it in either of two positions relative to the segment.

A transverse shaft 19 is journaled under the forward end of the shiftable frame 9 so as to move with said frame and secured to the end portions of this shaft are friction wheels or spools 20 so spaced as to simultaneously engage the rear wheels W of an automobile when the frame 9 is moved forwardly. A pulley 21 is secured to shaft 15 and is adapted to transmit motion through an endless belt 22 to a pulley 23 secured to a transverse shaft 24. This shaft is journaled on the rear portion of the frame 9 and extends transversely of said frame, one end of the shaft extending laterally beyond the frame and being provided with a circular saw 25 as shown.

Mounted on the sides of the shiftable frame 9 are parallel transverse beams 26 preferably held to the frame 9 by means of angular bolts 27 that are hooked under and held tightly against the sides of frame 9 as shown in Fig. 3. On the beams 26 is secured a table 27 having a slot 28 through which the saw extends.

It will be apparent that when lever 17 is thrown backwardly the levers 11 will move the frame 9 back so that the spool 20 will not engage the wheels W. Thus the structure can be drawn from place to place by the automobile to which it is attached. When it is desired to use the structure for sawing, the rear axle A of the automobile is lifted so as to raise the wheels W from the ground. The lever 17 is then thrust forwardly to force the spools 20 against the wheels W. By then driving the wheels W in the usual manner, motion will be transmitted therefrom and through spools 20, shaft 19 and belt 22 to the saw which will thus be rotated at a high speed.

By pulling lever 17 rearwardly, the rotation of the saw can be stopped even though the wheels W continue to rotate.

Figure 4:
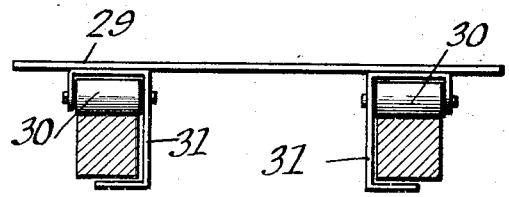
Fig. 4 is an end elevation of a carriage that can be used in lieu of the stationary table, shown in Figs. 1, 2 and 3, the means for supporting the carriage being shown in section.

Should it be desired to use a movable carriage in connection with the saw, the beams 26 of the table 27 can be disconnected from the frame 9 and a carriage such as shown at 29 in Fig. 4 can be substituted. This carriage has rollers 30 thereunder and angular hangers 31. The rollers are adapted to bear on the sides of the frame 9 and the hangers 31 are adapted to project under said sides. Thus the carriage can be moved forwardly and rearwardly along lines parallel with the plane of rotation of the saw. This carriage can obviously be substituted very readily for the detachable table 27.

What is claimed is:

1. The combination with the axle and rear wheels of a vehicle, of a trailer including rear supporting wheels, means for detachably connecting said wheels to the axle of the vehicle, a frame, means for slidably supporting said frame above one end portion of the trailer, oscillating means for supporting the other end portion of the frame, separate shafts journaled on said frame, means for transmitting motion from one shaft to the other, pulleys upon one of the shafts, and means for shifting the frame relative to the trailer to move the pulleys into engagement with the wheels of the vehicle for actuation thereby.

2. The combination with a trailer for attachment to the rear axle of a vehicle, of a frame movable longitudinally relative to and supported by the trailer, separate shafts journaled on the frame, means for transmitting motion from one shaft to the other, pulleys on one of the shafts for actuation by the wheels of a vehicle to which the trailer is attached, and means for shifting said frame relative to the trailer to move the pulleys into and out of engagement with the wheels of the vehicle to which it is hitched.

In testimony that I claim the foregoing as my own, I have hereto affixed my signature.

BENJAMIN THORN.